United States Patent [19]

Guiver et al.

[11] Patent Number: 4,598,137

[45] Date of Patent: Jul. 1, 1986

[54] POLYARYLENE POLYETHERSULFONE IONOMERS

[75] Inventors: Michael D. Guiver, Ottawa; Oleh Kutowy, North Gower; John W. Apsimon, Ottawa, all of Canada

[73] Assignee: Canadian Patents and Development Limited, Ottawa, Canada

[21] Appl. No.: 676,866

[22] Filed: Nov. 30, 1984

[51] Int. Cl.[4] .............................................. C08G 75/23
[52] U.S. Cl. .................................. 528/173; 528/174; 528/219; 562/466
[58] Field of Search ....................... 528/173, 174, 219

[56] References Cited

U.S. PATENT DOCUMENTS

| | | | |
|---|---|---|---|
| 4,197,393 | 4/1980 | Swedo et al. | 528/173 |
| 4,200,726 | 4/1980 | Ishii et al. | 528/174 |
| 4,384,063 | 5/1983 | Luxon | 528/173 |
| 4,396,755 | 8/1983 | Rose | 528/173 |

*Primary Examiner*—Lester L. Lee
*Attorney, Agent, or Firm*—Alan A. Thomson

[57] ABSTRACT

An aromatic ionomeric copolymer having arylether and arylsulfone linkages has been prepared by condensation of both:

(a) The alkali metal bisphenate salts of 9,9-bis(4-hydroxyphenyl-fluoren-4-carboxylic acid, optionally with up to 99 mol percent of another dihydric phenol based on the combined bisphenates in the mixture;

and (b) dihalodiphenylsulfones where the halogen is selected from chlorine or fluorine.

The copolymers are useful inter alia as ion exchange materials and permselective membranes.

A process of preparing and purifying the carboxylic acid containing bisphenol monomer is described.

14 Claims, No Drawings

POLYARYLENE POLYETHERSULFONE IONOMERS

This invention relates to polyarylethersulfone copolymers having pendant carboxyl groups useful as membranes in electrolytic cells, ion exchange etc.

Most of the research efforts on ionomers has been concentrated on styrenes, rubbers and substituted ethylenes. Information on such polymers their performance and uses are readily available in literature (Holiday, L., Ed. "Ionic Polymers", Halstead Press, Wiley N.Y. 1975).

More recently, aromatic ionomers (A. Eisenberg, F. W. Harris, H. L. Yeager et al. in Contemporary Topics in Polymer Science Vol. 5 Polymer Symposium Series 1982 p. 375) have been synthesized.

It is relevant that the incorporation of even small amounts of ions into polymers impart large changes in the polymer's physical characteristics. Properties such as water adsorption, water diffusion, permselectivity of membranes, glass transition temperature, decomposition temperature, moldability, stress crack resistance, flame resistance, dyeability as well as other properties can be altered to ones advantage by inclusion of ionic species into the parent polymer. Some characteristics such as hydrolytic stability or resistance to chemical oxidation are controlled by the structure of the polymer backbone.

Previously mentioned polymers of the styrene, rubber and ethylene types, with the exception of perfluorinated ethylene polymers (e.g. DuPont's Nafion TM) suffer from lack of hydrolytic or oxydative stability. This instability can be overcome by utilizing an aromatic backbone polymer such as the one prepared by Harris et al. [Ref. Polymer Preprints Ann. Chem. Soc. Div. Polym. Chem 19 (2) 394 (1978)]. The synthesis of these polymers is both complex and expensive.

It would be desirable to prepare other Polyarylether sulfones, as improved engineering thermoplastics, which exhibit excellent resistance to hydrolysis and oxidation and at the same time, excellent mechanical and thermal stabilities, toughness and ease of synthesis.

An ionomeric polysulfone has been described by J. P. Quentin (U.S. Pat. No. 3,709,841 Sulfonated Polyarylether Sulfones to Rhone-Poulenc Jan. 9, 1973) which was prepared by post-treating "Udel" (Union Carbide TM) Polyarylethersulfone with derivatives of sulfur trioxide. The glass transition temperature Tg goes up by almost 100° C. and the polymer attains some interesting properties.

Another ionomer of the polysulfone type as taught by Ghazl Kbattab (U.S. Pat. No. 3,723,389 Mar. 27, 1973 to Allied Chemical Corp.) involves the use of bisphenates containing carboxylate on the central alkyl portion. This provides an ionomer backbone that is stable, but the carboxylate can be oxydized or cleaved due to its alkyl position.

This application reveals a novel carboxylate containing polymer with the carboxy moiety having enhanced stability due to it being directly on an aromatic ring and having the ease of preparation of ordinary polyarylether sulfones eg. as taught by Robert N. Johnson et al. (U.S. Pat. No. 4,108,837 Aug. 22, 1978 to Union Carbide "Polyarylene Polyether"). A specific dihydric phenol carboxylate is utilized in preparing this copolymer.

The carboxy containing monomer is a bisphenol of formula I.

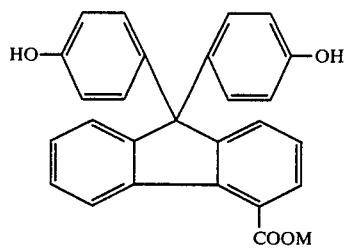

It has been recorded previously in the literature but it has been synthesized under different conditions[2] and as an impure[1] compound[3,4] from 9-Fluorenone-4-carboxylic acid. This carboxylic acid containing bisphenol has now been prepared by us sufficiently pure to be used as a monomer evidently for the first time, in the synthesis of polyarylene polyethersulfone ionomers. The monomer precursor, 9-Fluorenone-4-carboxylic acid was readily prepared by the dehydration of Diphenic Acid using known methods[1]. The tricyclic monomer precursor was reacted with an excess of phenol in the presence of hydrogen chloride and mercaptopropionic catalyst to give monomer I as the main product in greater than 90% yield.

1. E. H. Huntress, K. Pfister 3rd, and K. H. T. Pfister, J.Am.Chem.Soc. 64, 2845(1943).
2. F. Bell and F. Briggs, J. chem. Soc. 1561 (1938).
3. H. W. Underwood and E. L. Kockmann, J. Am. Chem. Soc., 45, 3071 (1923).
4. C. Graebe and Ch. Aubin, Ann., 247, 257 (1888).

The crude monomer was converted to its sodium salts aqueous phase by reaction with excess sodium bicarbonate. The hot water soluble sodium salts derivative was treated with an adsorbant, filtered to remove particulates and then allowed to precipitate with cooling. The precipitate was isolated by filtration, redissolved in hot water and reprecipitated by addition of acid to give monomer I. This process was repeated if necessary to obtain the pure product.

SUMMARY OF THE INVENTION

The invention provides a polyarylethersulfone copolymer having pendant carboxyl groups, formed by condensation of monomers comprising:
(a) a dihydric phenol monomer comprising 9,9-bis(4-hydroxyphenyl)-fluoren-4-carboxylic acid as alkali metal salt, and
(b) a dihalodiphenylsulfone where the halogen is selected from chloro and fluoro groups.

The dihydric phenol monomer may be a mixture including additional dihydric phenols as alkali metal salt for condensation. The optional additional dihydric phenols may be selected from di(hydroxyphenyl)methanes, di(hydroxyphenyl)sulfones and di(hydroxyphenyl)ethers. Preferably the additional dihydric phenol is selected from 2,2-bis-(4-hydroxyphenyl)propane; 2,2-bis(4-hydroxyphenyl) 1,1,1,3,3,3hexafluoropropane 4,4'-dihydroxy-biphenyl; 9,9-bis(4-hydroxyphenyl)-fluorene; bis-(4-hydroxyphenyl)sulfone; bis-(4-hydroxyphenyl)ether.

The final copolymers may have its pendant carboxyl groups in the acid, salt or ester from. The quaternary ammomium form may also be used. the esterifying group may be a lower alkyl group) 1-4" carbon atoms or an aryl group. The copolymer can be prepared as a permselective membrane (see example below).

The copolymer may be described as having the formula

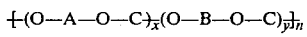

where
A is any non-fluorene carboxylate containing dihydric phenol residue,
B is the carboxylated fluorene dihydric phenol residue,
C is the diphenylsulfone residue,
x=0-99% and y=1-100% of the total x+y units, and n is a number high enough to give a molecular weight of at least about 15,000.

The phenolic precursor of "A" may be defined by the formula

III

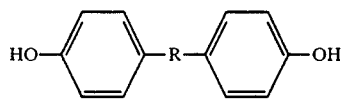

where R is selected from sulfone, ether or substituted methane moieties.

The phenolic precursor of "B" may be defined by the formula

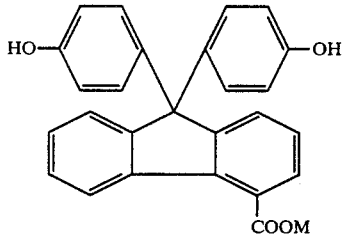

where M is selected from hydrogen, metal cations, quaternary ammonium and esterifying groups.

The diphenylsulfone residue C is of the formula

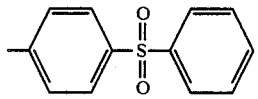

The invention also includes a process of purifying and recovering the bis-phenol monomer 9,9-bis(4-hydroxyphenyl)-fluoren-4-carboxylic acid from a crude reaction product mixture, comprising
(a) preparing an alkali metal salt of the monomer by addition of corresponding alkali metal base in aqueous medium,
(b) filtering the medium through a decolourising adsorbant,
(c) crystallizing by cooling and isolating the alkali metal bisphenol salt crystals,
(d) redissolving the crystals acidifying the alkali metal bisphenol salt, and
(e) recovering the above monomer as a precipitate.

The polyarylene polyether ionomers are prepared by condensation reaction, in approximately equimolar amounts, of the triple alkali metal salt of the carboxylate containing bisphenol monomer and the dihalodiphenylsulfone monomer, optionally with up to 99% of the total dihydric phenol, of another dihydric phenol as the double alkali metal salt. The reaction takes place under anhydrous conditions in a suitable dilpolar aprotic solvent such as dimethylsulfoxide. The formation of the alkali metal salts may take place in situ with removal of any water. The reaction proceeds in the liquid phase at elevated temperature usually about 100°-180° C., preferably about 160°-165° C.

DETAILED DESCRIPTION

The polyarylene polyether sulfone ionomers of this invention are synthesized by the reaction of the active or carboxy functional dihydric phenol of formula I and a neutral non-functional dihydric phenol to be specified further essentially equimolarly with a dihalobenzoid compound in a non reactive solvent under anhydrous conditions, to produce a high molecular weight carboxy containing polymer of formula II.

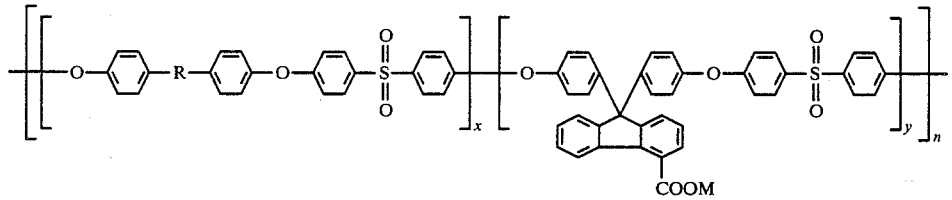

where R is a suitable substituent to make one of the dihydric phenols of formula III as mentioned further in this disclosure.

The dihydric phenol of formula I is mixed with 0-99% of a non-functional dihydric phenol of formula III such as for instance Bisphenol-A and others mentioned later and placed in solvent mixture comprising a reaction solvent such as sulfoxide (or other suitable reaction solvent) and an azeotrope former, usually in a respective v/v ratio within the range 0.33-1.1 preferably at about a 75% ratio. Forming the salts of the dihydric phenols referred to as bisphenate salts in situ by the addition of alkali metal hydroxides equimolarly or in small excess. Any of the alkali metal hydroxides can be employed to form the alkali metal salts of the dihydric phenols in this technique. Potassium salts were found to react considerably faster than sodium and are preferred.

The in-situ preparation of the bisphenate salts is performed by heating the alkali metal hydroxide with the dihydric phenol in solvent and azeotrope former for several hours, removing the azeotrope continuously to remove the water of reaction, since the further condensation requires essentially anhydrous conditions. The azeotrope former can be chosen from those that are preferably miscible with the solvent for the polymerization and act as a diluent for the polymer, with the restriction that it should not cause the polymer to precipitate and be thus removed from the reaction and from growth to high molecular weights. It has been found convenient to employ xylene, benzene, toluene and halogenated benzene as azeotroping liquids. The choice of these liquids is determined by its compatibility with the reactants ie. solubility of polymer as well as the temperature required in the reaction vessel. The refluxing liquid once anhydrous can also be used as a temperature control if it is itself lower boiling than the main solvent.

The choice of dihydric phenol of formula III selected from 2,2-bis-(4-hydroxyphenyl)propane; 2,2-bis-(4-hydroxyphenyl) 1,1,1,3,3,3 hexafluoropropane; 4,4'-dihydroxy-biphenyl; 9,9-bis(4-hydroxyphenyl)-fluorene; bis-(4-hydroxyphenyl)sulfone; bis-(4-hydroxyphenyl)ether; is not critical in this invention except as choice will determine part of the final stability of the backbone of the ionomer.

After the water has been removed, and excess azeotrope former has either been partially removed by distillation or partially replaced by another co-diluent, or otherwise adjusted so that it is at the optimum ratios with the solvent, as mentioned earlier. The reaction with dihalobenzoid compound can proceed.

It is necessary to exclude oxygen from the reaction to prevent oxydation of the reactants especially at the higher temperatures required during polymerization. An inert atmosphere purge and blanketing is required. Gases such as nitrogen and preferably argon can be employed for this purpose.

In this invention the dihalobenzoid compound can be chosen from dichlorodiphenyl sulfone (DCDFS) or the preferred difluorodiphenyl sulfone (DFDFS).

The polymerization is conducted between 100° C. and 180° C. and preferrably about 160°–165° C. in the solvent such as dimethylsulfoxide and in the presence of the azeotroping fluid such as toluene, for several hours or until a sufficient molecular weight has been reached as indicated by the viscosity of the reaction mixture.

The ionomer is recovered from the polymerization mixture by precipitation into preferrably an agitated non-solvent miscible with the solvents and removing the solid ionomer by filtration. The ionomer can be converted to its acid form by simply soaking in dilute mineral acid. The alkali metal salt form of the ionomer can be further treated in a dimethylsulfoxide solution to form an ester by introduction of any of a series of haloalkanes with heating if necessary to dissolve any of the constituents.

The ionomer forms viscous solutions with any of the dipolar aprotic solvents chosen from, 1-methyl-2 Pyr-rolidinone, γ-Butyrolactone, Dimethylsulfoxide among others. The esterified form of the ionomer formula II where COOM represents the ester can be dissolved in solvents such as tetrahydrofuran, the dipolar aprotic solvents mentioned previously and a number of halogenated solvents.

EXPERIMENTAL RESULTS AND EXAMPLES

The following steps in the monomer preparation were used:

1. 9-Fluorenone-4-Carboxylic Acid

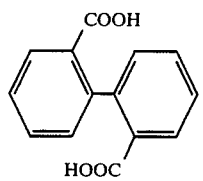

Diphenic acid (500 g, 2.06 Mol) was reacted with concentrated sulfuric acid (1250 mL, S.G. 1.84) at 140° C. for 35 minutes following the procedure of Huntress et al.[1] The red solution was cooled and precipitated by pouring the mixture into 15 L of distilled water. The yellow precipitate was boiled with 10 L of water, filtered and boiled with a further 10 L of water. The dried yellow product 9-fluorenone-4-carboxylic acid (463 g, 81% yield) was used in the next step without further purification.

[1]. E. H. Huntress, K. Pfister 3rd, and K. H. T. Pfister, J. Am. Chem. Soc., 64, 2845 (1942).

2. 9,9-bis(4-hydroxyphenyl)-Fluoren-4-Carboxylic Acid

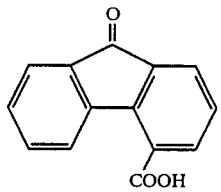

9-fluorenone-4-carboxylic acid (538 g, 2.4 moles) was reacted with an excess of phenol (1130 g, 12 moles) and a catalytic amount of mercaptopropionic acid. The mixture was maintained at a temperature of 50° C. with stirring and while bubbling in anhydrous HCl gas for a period of 6 hours and then allowed to stand under inert atmosphere. The excess phenol was removed by conventional steam distillation. The filtrate was washed extensively with boiling water as before to give ≧90% yield of named monomer I, 9,9-bis(4-hydroxyphenyl)-fluoren-4-carboxylic acid.

Purification of 9,9-bis(4-hydroxyphenyl)-fluorene-4-carboxylic acid, monomer I

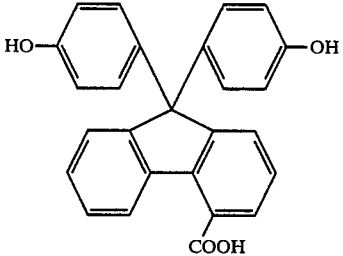

The key step in the purification of I is the crystallization of its sodium salt derivative. The amount of sodium bicarbonate used to make the salt is critical as equimolar quantities result in a sodium salt that cannot be easily filtered. Based on the limited scope of some small scale tests, the ideal w/w ratio is monomer I:NaHCHO₃:Water.

1:1:35

400 g of crude product was placed in a 20 beaker with 8 L water and heated to approximately 60° C. 400 g of NaHCO$_3$ was added in portions until effervescence ceased and then the total volume was made up to 14 L with water and heated to boiling. The sodium salt product was filtered on a Buchner funnel after overnight crystallization. The crystals were redissolved in 14 L of hot water and decolourising adsorbent e.g. charcoal added. The solution was stirred at 70° C.–85° C. for one hour and then filtered hot on a cellulose fiber bed. The clarified solution was neutralised by adding concentrated hydrochloric acid with stirring, and then the suspension was heated to boiling to coagulate the precipitate. After filtering, washing and drying, the product weighed 259 g (65% of crude).

This material was further purified by suspending the product in 6 L of water and adding 280 g NaHCO$_3$. Following the same purification technique, 242 g of pure monomer I was recovered.

Anal. C: 79.17%, H: 4.60%. Found. C: 78.90%, H: 4.89%.

Mass Spectrum: m/e (relative intensity), M+1 395(25), M 394 (93), 350(35), 349(97), 348(19), 302(14), 301(60), 257(12), 256(12), 255(30), 226(50).

General Procedure for Polymer Preparations

One of the requirements for the synthesis of high molecular weight polymer is that the monomers and solvents are sufficiently pure. Monomer I was purified as previously described. Neutral bisphenol monomers such as Bisphenol-A were available commercially as a sufficiently pure product. Dichlorodiphenylsulfone (DCDPS) and Difluorodiphenylsulfone (DFDPS) were recrystallized from ethanol until pure (99+%). The reaction solvents were dipolar aprotic solvents mixed with an azeotroping solvent. These were purified by distillation under vacuum and at atmospheric pressure respectively. Baker TM analyzed grade of NaOH and KOH was used as obtained. The general preferred procedure for polymer preparation was as follows:

Bisphenol monomer I or a mixture of I and neutral bisphenols were dissolved in a dipolar aprotic solvent together with an azeotroping solvent in a resin kettle equipped with a mechanical stirrer, inert gas inlet, thermocouple and a Dean-Stark teap to remove water from the azeotroping mixture. An equimolar quantity of base with respect to total phenolic and carboxylic protons was added as a concentrated solution. The mixture was then stirred at reflux temperature under an inert atmosphere until no more water distilled over. The dihalocomonomer was added as a solution in an equimolar quantity with respect to the bisphenols. The azeotroping solvent was distilled off to increase the reaction temperature to approximately 165° C. and maintained at this temperature. After a suitable time when the mixture had become more viscous, the polymer was recovered by precipitating it into a non solvent such as an alcohol. The polymer was further leached of solvents and inorganic salts before drying.

TABLE 1

| Polymer | Water Uptake % | Measured Equivalent Weight | TGA °C. ± 10 | Tg °C. ± 10 |
|---|---|---|---|---|
| Control Reference* polymers** | ~2.6 ~2 | — — | | 190 215 |
| Example 1 | 22 | 830 | 400+ | >300+ (indefinite) |
| Example 2 | 21.5 | 945 | 400 | 320 |

TABLE 1-continued

| Polymer | Water Uptake % | Measured Equivalent Weight | TGA °C. ± 10 | Tg °C. ± 10 |
|---|---|---|---|---|
| Example 3 | 15.1 | 1630 | 420 | 320 |
| Reference material*** | 11.2 | 2140 | 410 | 254 |

*Polyarylenepolyethersulfone from Union Carbide (Udel TM)
**Polyarylenepolyethersulfone from Union Carbide (Radel TM)
***Polyarylenepolyethersulfone where dihydric phenol is a mixture 50/50 mol ratio of bisphenol-A and bisphenol of levulinic acid (see U.S. Pat. No. 3,723,389 March 27, 1973)

The water uptake or sorption was carried out at 25° C. in 0.1M NaCl.

$$\frac{(\text{weight of water equilibrated polymer} - \text{wt of dry polymer} \times 100)\%}{\text{wt of dry polymer}}$$

The equivalent weight was measured by titration of the polymer in the sodium form with acid and then back with base.

Ion exchange capacity is generally represented by the "equivalent weight" which is the weight of dry polymer in the acid form required to react completely with (neutralize) 1 mole of NaOH or which contains one mole of exchange sites. The TGA (onset of decomposition-temperature initial weight loss begins) was obtained from a DuPont 1090 Thermal Analyser with a 951 Thermogravimetric module using a 50 ml/min. nitrogen flow. The Tg (glass transition temperature) was obtained from the same thermal analyser with a Model 910 Differential Scanning Calorimeter module.

EXAMPLE 1

Preparation of polymer from Monomer 1 and Dichlorodiphenyl sulfone (DCDPS)

Bisphenol Monomer I (39.443 g, 0.100 mol) and an aqueous solution of sodium hydroxide (12.03 g, 0.30 mol) were mixed with DMSO (100 mL) and toluene (150 mL) in a 500 mL resin kettle. After four hours of water removal, the temperature was increased to 150° C. and dichlorodiphenylsulfone (28.716 g, 0.100 mol) was added as a slurry in toluene. Stirring was continued at 160°–165° C. for 6 hours after which time the polymer was precipitated into ethanol. If an ethanol or water suspension of this polymer was heated when residual DMSO was present, the polymer would dissolve. However, in the absence of DMSO, the polymer did not dissolve. The polymer was reprecipitated into isopropanol, washed and dried in the usual manner to give 59.5 g. The polymer was soluble in DMSO, 1-methyl-2-pyrrolidinone, NMP, and other like solvents. The methylated derivative would not dissolve in tetrahydrofuran THF, whereas the butylated derivative was soluble in THF. The available characteristics are shown in the attached table.

EXAMPLE 2

Preparation of polymer from Bisphenol Monomer I and Difluorodiphenylsulfone (DFDPS)

Bisphenol Monomer I (78.886 g, 0.200 mol) was dissolved in distilled DMSO (200 mL) and a 40% aqueous solution of potassium hydroxide (Baker analysed, assay KOH=86.6%, 40,82 g, 0.60 mol+0.5% excess) was added, followed by distilled xylene (190 mL). The resin kettle was equipped with a mechanical stirrer, nitrogen inlet, thermocouple and Dean-Stark trap. The contents were stirred at reflux temperature under an atmosphere of dry nitrogen until no more water distilled over (5 hours). The monomer DFDPS (50.851 g, 0.200 mol) was added as a hot solution in dry xylene (60 mL) and the remainder was washed in with dry DMSO (170 mL). Xylene was distilled off and the reaction was stirred at 165° C. After 1½ hours, the mixture became viscous and a further quantity of DMSO (100 mL) was added. Stirring was continued for a total of 7 hours and then the polymer was precipitated into isopropanol in a blender, washed with isopropanol and then left to stand overnight in isopropanol. The next day the polymer was treated with hot water (3×3 L), once with isopropanol and then dried in a vacuum oven at 70°–90° C. for 2–3 days.

The polymer was soluble in a number of solvents to give very viscous solutions indicative of a high molecular weight. Strong transparent membrane sheets were cast from these solutions.

EXAMPLE 3

Preparation of a random copolymer from Bisphenol A, Bisphenol I and DFDPS

Bisphenol monomer I (19.721 g, 0.05 mol) and bisphenol-A (11.415 g, 0.050 mol) were dissolved in 150 mL DMSO and placed in reaction flask and 200 mL xylene added. A 40–50% solution of KOH (0.25 mol+1% excess) was added and the mixture azeotroped under dry nitrogen for 5 hours. Then some xylene was distilled off to raise the temperature of the reaction to 150° C. DFDPS (25.426 g, 0.100 mol) was dissolved in 60 mL of xylene and the solution added to the reactor slowly with continuous stirring. The xylene was distilled off at a temperature of 165° C. and a further 50 mL of DMSO added.

The reaction was allowed to proceed for 8 hours at 165° C. and a high yield ($\geq 95\%$) polymer was recovered as before. The polymer was soluble in DMSO and NMP solvents which are often used in membrane casting formulations.

Both porous and nonporous membranes were cast from this copolymer using ~15% polymer in NMP. When the solution was allowed to evaporate completely (on a glass plate in a vacuum oven at 55°–60° C.) a tough flexible transparent film was obtained. When the solution was cast on a glass plate and immersed in water, a porous membrane resulted. Other characteristics are described in the attached table.

EXAMPLE 4

Preparation of a random copolymer from Bisphenol I, Bisphenol-A and DCDPS

Bisphenol-A (11.415 g, 0.050 mol), Bisphenol I (19.721 g, 0.050 mol) and an aqueous solution of sodium hydroxide (10.00 g, 0.25 mol) was mixed with DMSO (50 mL) and toluene (150 mL) in a resin kettle. The flask was equipped with a mechanical stirrer, nitrogen inlet, thermocouple and Dean-Stark trap. The mixture was stirred at reflux for 4 hours until no more water was removed and then the reaction temperature was increased to 150° C. by distilling off toluene. The sulfone monomer DCDPS (28.716 g, 0.100 mol) was added as a slurry in toluene, and the remainder was washed in with DMSO (50 mL). Toluene was distilled off and the reaction was stirred at 165°–170° C. for 5½ hours. The polymer was precipitated into ethanol, washed several times with boiling water and finally ethanol, then dried under vacuum for 24 hours at 90° C. The yield of polymer was 51.8 g (99%). The viscosity of this polymer was lower than in the previous example 3 and thus weaker membranes were produced.

EXAMPLE 5

Esterification of Ionomer from Example 1 Using Chloromethane 8 grams of the ionomer from example 1 were dissolved in 30 mL of DMSO and chloromethane was bubbled into the solution. After 20 minutes the solution had turned a lighter colour and had become less viscous. The polymer solution was precipitated into isopropanol washed several times with water and alcohol and then dried. By this reaction, the pendant sodium carboxylate groups were converted to methyl ester groups and the reactive chain end phenoxide groups were converted to methyl ethers.

EXAMPLE 6

Esterification of Ionomer from Example 1 Using 1-bromobutane 4 grams of the ionomer from example 1 were dissolved in 20 mL DMSO and 10 mL 1-bromobutane added. The mixture was refluxed in an inert atmosphere of nitrogen for 30 minutes and then precipitated into isopropanol and treated as in the previous example 5. This butyl ester was soluble in tetrahydrofuran unlike the methyl ester derivative of example 5.

EXAMPLE 7

Preparation of Free Acid Polymers

The alkali metal carboxylate polymers of examples 1–4 were converted to their carboxylic acid forms by treatment with dilute hydrochloric acid in aqueous media. Other mineral acids were suitable also.

We claim:

1. A polyarylethersulfone copolymer having pendant carboxyl groups, formed by condensation of monomers comprising:
   (a) a dihydric phenol monomer comprising 9,9-bis(4-hydroxyphenyl)-fluoren-4-carboxylic acid as alkali metal salt,
   and
   (b) a dihalodiphenylsulfone where the halogen is selected from the chloro and fluoro groups; said monomers (a) and (b) being condensed in approximately equimolar amounts.

2. The copolymer of claim 1 wherein the dihydric phenol monomer condensed is a mixture including additional dihydric phenols as alkali metal salts.

3. The copolymer of claim 2 wherein the additional dihydric phenol is selected from the group consisting of dihydroxydiphenylmethanes, di(hydroxyphenyl)sulfones and di(hydroxyphenyl)ethers.

4. The method of claim 2 wherein the additional dihydric phenol is selected from 2,2-bis-(4-hydroxyphenyl)propane; 2,2-bis(4-hydroxyphenyl) 1,1,1,3,3,3-hexafluoropropane; 4,4'-dihydroxy-biphenyl; 9,9-bis(4-hydroxyphenyl)-fluorene; bis-(4-hydroxyphenyl)sulfone; bis-(4-hydroxyphenyl)ether.

5. The copolymer of claim 4 wherein the additional comonomer is bisphenol-A.

6. The copolymer of claim 1 having a molecular weight within the approximate range 15,000–150,000.

7. The copolymer of claim 1 wherein the carboxyl groups in the copolymer are in salt, or ester form.

8. The copolymer of claim 7 in salt form the salt cations being sodium, potassium, calcium or quaternary ammonium.

9. The copolymer of claim 7 in ester form, the esterifying group being lower alkyl of 1–4 carbon atoms or aryl.

10. The copolymer of claim 1 in permselective membrane form.

11. The copolymer of claim 1 having the formula

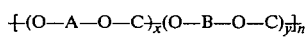

where
A is any non-fluorene carboxylate containing dihydric phenol residue,
B is the carboxylated fluorene dihydric phenol residue,
C is the diphenylsulfone residue,
x=0–99% and y=1–100% of the total x+y units, and n is a number high enough to give a molecular weight of at least about 15,000.

12. The copolymer of claim 11 wherein A has the structural formula

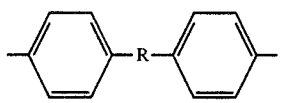

where R is selected from sulfone, ether or lower alkyl-substituted methane moieties.

13. The copolymer of claim 11 wherein B has the structural formula:

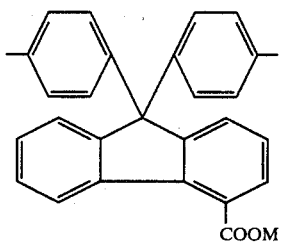

where M is selected from hydrogen, metal cations, quaternary ammonium, and esterifying groups selected from lower alkyl or aryl groups.

14. The copolymer of claim 11 wherein C has the formula

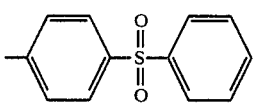

* * * * *